United States Patent
Zhang

(10) Patent No.: US 10,083,676 B2
(45) Date of Patent: *Sep. 25, 2018

(54) METHOD FOR ADJUSTING SCREEN DISPLAYING DIRECTION AND TERMINAL

(71) Applicant: Guangdong Oppo Mobile Telecommunications Corp., Ltd., Dongguan, Guangdong (CN)

(72) Inventor: Haiping Zhang, Guangdong (CN)

(73) Assignee: Guangdong Oppo Mobile Telecommunications Corp., Ltd., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/709,097

(22) Filed: Sep. 19, 2017

(65) Prior Publication Data

US 2018/0005608 A1    Jan. 4, 2018

Related U.S. Application Data

(63) Continuation of application No. 15/606,431, filed on May 26, 2017, which is a continuation-in-part of
(Continued)

(30) Foreign Application Priority Data

Jul. 23, 2015  (CN) .......................... 2015 1 0439751

(51) Int. Cl.
*G06K 9/00* (2006.01)
*G09G 5/38* (2006.01)

(52) U.S. Cl.
CPC ........... *G09G 5/38* (2013.01); *G06K 9/00087* (2013.01); *G09G 2340/0464* (2013.01); *G09G 2354/00* (2013.01)

(58) Field of Classification Search
CPC ........... G06K 9/00006; G06K 9/00087; G09G 2340/04; G09G 2340/0492;
(Continued)

(56) References Cited

U.S. PATENT DOCUMENTS

2004/0201595 A1* 10/2004 Manchester .......... G06F 1/1626
345/649
2009/0201257 A1* 8/2009 Saitoh .................... G06F 1/162
345/173
(Continued)

FOREIGN PATENT DOCUMENTS

| CN | 101506760 A | 8/2009 |
|----|-------------|--------|
| CN | 101571787   | 11/2009 |

(Continued)

*Primary Examiner* — Michael Pervan
(74) *Attorney, Agent, or Firm* — Young Basile Hanlon & MacFarlane, P.C.

(57) ABSTRACT

Provided is a method for adjusting a screen display direction and a terminal. The method includes the follows. At least one authority fingerprint is acquired, and the authority fingerprint is a fingerprint having the authority of changing a screen display direction. A first fingerprint is acquired. When the first fingerprint is the authority fingerprint, an input direction of the first fingerprint is acquired. The screen display direction is adjusted according to the input direction of the first fingerprint. If the first fingerprint is acquired again, a time period for acquiring the first fingerprint is recorded. The size of the screen display area is adjusted according to the recorded time period of the first fingerprint.

12 Claims, 10 Drawing Sheets

Related U.S. Application Data application No. PCT/CN2016/090037, filed on Jul. 14, 2016.

(58) Field of Classification Search
CPC ...... G09G 2340/0407; G09G 2340/045; G06F 2203/0336; G06F 2203/0338
USPC .......................... 178/18.01–19.07; 340/5.83; 345/156–167, 173–178; 715/700–866
See application file for complete search history.

(56) References Cited

U.S. PATENT DOCUMENTS

| | | | | |
|---|---|---|---|---|
| 2011/0154390 A1* | 6/2011 | Smith | ................. | H04N 21/482 |
| | | | | 725/32 |
| 2014/0212008 A1* | 7/2014 | Hatcher, II | ......... | G06K 9/00033 |
| | | | | 382/124 |
| 2016/0372088 A1* | 12/2016 | Dow | ........................ | G09G 5/38 |

FOREIGN PATENT DOCUMENTS

| | | |
|---|---|---|
| CN | 102736854 | 10/2012 |
| CN | 103076960 A | 5/2013 |
| CN | 104679401 A | 6/2015 |
| CN | 105005386 A | 10/2015 |
| JP | 2002-44727 A | 2/2002 |

* cited by examiner

METHOD FOR ADJUSTING SCREEN DISPLAYING DIRECTION AND TERMINAL

CROSS-REFERENCE TO RELATED APPLICATION(S)

This application is a continuation of U.S. application Ser. No. 15/606,431, filed on May, 26, 2017, which is a continuation-in-part of international application No. PCT/CN2016/090037, filed on Jul. 14, 2016, which claims priority to Chinese Patent Application No. 201510439751.8, filed on Jul. 23, 2015, the contents of all of which are herein incorporated by reference in their entireties.

TECHNICAL FIELD

The present disclosure relates to electronic technology field and particularly relates to a method for adjusting a screen display direction and a terminal.

BACKGROUND

With the development of science technology, the display screen of a terminal becomes larger and larger, and functions of the terminal are more and more diversified. Among the functions of the terminal, playing video is the most basic one. In the process of playing video, since the placement state of the terminal varies, the screen display direction of the terminal needs to be adjusted, so that to obtain a better viewing effect. A traditional manner to adjust the screen display direction is to set the screen display direction in a menu of the terminal, however, the operating procedure thereof is complex; besides, a user needs to stop playing the video to set the screen display direction, which affects the video viewing effect.

The terminal is disposed with a gravity sensor in the related art, and the gravity sensor is used to detect in every period whether the orientation of the terminal is changed, so as to adjust display direction of the screen. For example, the gravity sensor detects in every period whether the orientation of the terminal is changed, if YES, the gravity sensor detects the orientation of the terminal after the change and the screen display direction can be adjusted in time. However, due to the high sensitivity of the gravity sensor, the vibration of the terminal caused by disturbance may result in misjudgment of the gravity sensor, which can change screen display direction, and as a result, the user experience is reduced.

BRIEF DESCRIPTION OF THE DRAWINGS

To better illustrate the technical solution of implementations of the present disclosure, the following descriptions will briefly illustrate the accompanying drawings described in the implementations. Obviously, the following described accompanying drawings are some implementations of the present disclosure. Persons skilled in the art can derive other accompanying drawings from these accompanying drawings without creative effort.

DETAILED DESCRIPTION

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained therefrom without any creative work by those of ordinary skill in the art shall fall within the protection scope of the present disclosure.

By means of implementations of the present disclosure, a screen display direction can be adjusted according to an input direction of a fingerprint.

The terms "first", "second", "third", and "fourth" used in the specification, the claims, and the figures of the present disclosure are used to distinguish one object from another instead of specifying a certain sequence. The terms "include", "comprise", "contain", "have" as well as variations thereof are intended to cover a non-exclusive inclusion. For example, processes, methods, systems, products, or devices including a series of steps or units are not limited to listed steps or units, it may optionally include unlisted steps or units, or include other inherent steps or units for the processes, methods, systems, products, or devices.

Figure 1:
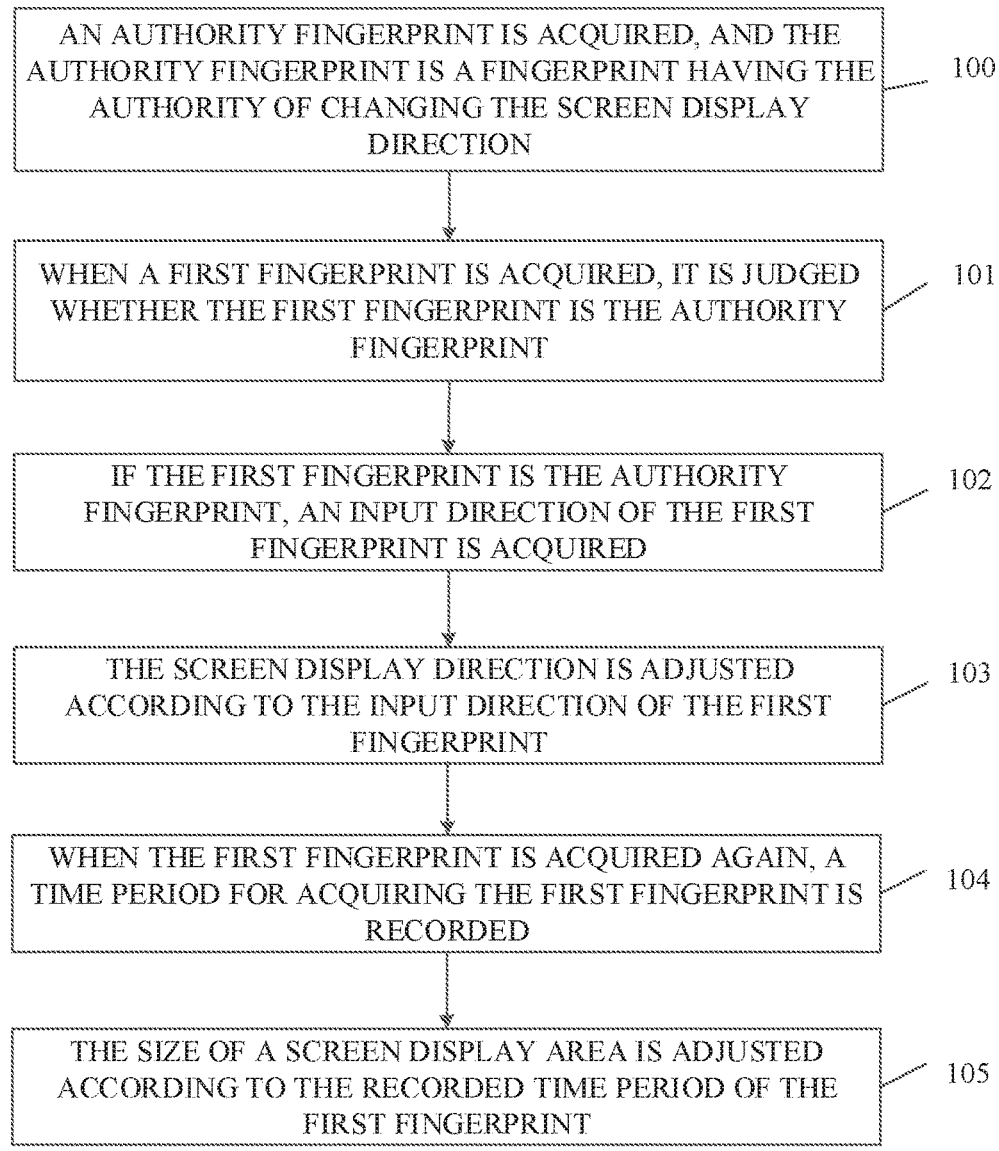
FIG. 1 is a schematic flowchart illustrating an implementation of a method for adjusting a screen display direction of the present disclosure.

Referring to FIG. 1, FIG. 1 is a schematic flowchart illustrating an implementation of a method for adjusting a screen display direction of the present disclosure. Methods according to implementations of the present disclosure can be implemented by a terminal, which can be a mobile phone, tablet PC, laptop, pocket PC, mobile internet device (MID), wearable device (such as a smart watch, smart bracelet, pedometer and the like) or other terminals whose screen display direction can be adjusted.

A method is provided according to implementations of the present disclosure. In this method, an authority fingerprint is acquired, and the authority fingerprint is a fingerprint having the authority of changing the screen display direction; when a first fingerprint is acquired, it is judged whether the first fingerprint is the authority fingerprint; if the first fingerprint is the authority fingerprint, an input direction of the first fingerprint is acquired; the screen display direction is adjusted according to the input direction of the first fingerprint. The method will be described in detail in combination with implementations below.

As illustrated in FIG. 1, a method for adjusting a screen display direction according to an implementation of the present disclosure can begin at block 100.

At block 100, at least one authority fingerprint is acquired, and the authority fingerprint is a fingerprint having the authority of changing the screen display direction. The term "authority fingerprint" used herein can refer to one authority fingerprint or a plurality of authority fingerprints, the present disclosure is not limited thereto, and the quantity thereof can be set according to actual needs. In the following, for purpose of explanation, take one authority fingerprint as an example.

In specific implementations, the terminal can acquire at least one fingerprint, for example, the terminal can acquire a second fingerprint and a third fingerprint input by a first user, and the first user can be a user to whom the terminal belongs. The second fingerprint acquired by the terminal can be a fingerprint of the right index finger, the third fingerprint can be a fingerprint of the left index finger. The terminal can also set the second fingerprint as the authority fingerprint according to settings of a user, the authority fingerprint has the authority of changing the screen display direction. When the fingerprint of the right index finger of the first user is recognized, the terminal enters a state of changing the screen display direction.

As an implementation, the terminal can also set the third fingerprint as a fingerprint having other functional authorities according to settings of the user.

As an implementation, the terminal can allow other users to input a fingerprint that has the authority of changing the screen display direction. For example, the terminal can receive a fourth fingerprint input by a second user, and set the fourth fingerprint as a fingerprint having the authority of changing the screen display direction according to settings of any user (the first user or the second user). The terminal can also receive a fifth fingerprint input by a third user, and set the fifth fingerprint as a fingerprint having the authority of changing the screen display direction according to settings of any user (the first user, the second user, or the third user). Screen display direction changed by different authority fingerprints varies and can be set according to settings of users.

At block 101, when a first fingerprint is acquired, it is judged whether the first fingerprint is the authority fingerprint.

In specific implementations, after setting authority fingerprints and screen display directions corresponding to the authority fingerprints, the terminal can acquire a fingerprint via a fingerprint sensor. The manner of acquiring fingerprints by the fingerprint sensor of this implementation can be sliding. Because of the small occupied area, a sliding fingerprint sensor is more flexible for product design, so that it is widely deployed on a variety of smaller electronic terminals. When a finger of the user slides over the surface of the fingerprint sensor, the terminal can acquire clear fingerprint details and seize fingerprint features via scanning or a series of snapshots. When the first fingerprint has been acquired, the terminal judges whether the first fingerprint is the authority fingerprint according to seized fingerprint features, namely, judges whether the first fingerprint is one of the second fingerprint input by the first user, the fourth fingerprint input by the second user, and the fifth fingerprint input by the third user and therefore has the authority of changing the screen display direction; if so, the terminal acquires an input direction of the first fingerprint; otherwise, the process ends, and the terminal does not perform any operation about changing the screen display direction, or the terminal judges whether the first fingerprint is a fingerprint having other functions.

At block 102, if the first fingerprint is the authority fingerprint, an input direction of the first fingerprint is acquired.

In specific implementations, after determining that the first fingerprint is the authority fingerprint, the terminal can judge that the first fingerprint is one of the second fingerprint input by the first user, the fourth fingerprint input by the second user, and the fifth fingerprint input by the third user, and the terminal can acquire a sliding direction of the finger of the user as well as an input direction of the fingerprint via the fingerprint sensor.

At block 103, the screen display direction is adjusted according to the input direction of the first fingerprint.

In specific implementations, the case where the terminal determines the first fingerprint acquired is the second fingerprint input by the first user is taken as an example, after the first user sets the second fingerprint to be the authority fingerprint, the terminal can preset corresponding screen display directions for each input direction of the second fingerprint according to settings of the first user. When an input direction of the first fingerprint has been acquired, the terminal compares the acquired input direction of the first fingerprint with preset input directions of the second fingerprint one by one. For example, the user presets input direction#1, input direction#2, input direction#3, and input direction#4 for the second fingerprint, the terminal compares the acquired input direction of the first fingerprint with the above-mentioned four input directions of the second fingerprint one by one. If the terminal finds out that the input direction of the second fingerprint that is the same as the input direction of the first fingerprint is input direction#4 of the second fingerprint, the terminal finds the screen display direction corresponding to input direction#4 of the second fingerprint, and then adjusts the current screen display direction of the terminal to the screen display direction corresponding to input direction#4 of the second fingerprint.

In addition, in some implementations of the present disclosure, a terminal can execute the following procedures to adjusting the screen display direction: the terminal acquires a first fingerprint. Then the terminal acquires an input direction of the first fingerprint. At last, the terminal adjusts the screen display direction according to the input direction of the first fingerprint.

At block 104, when the first fingerprint is acquired again, a time period for acquiring the first fingerprint is recorded.

In specific implementations, after adjusting the screen display direction, if the first fingerprint is acquired again, the terminal records a time period that the first fingerprint stays on the fingerprint sensor. For example, the first user can keep the right index finger pressing the fingerprint sensor, such that the fingerprint sensor can record the time period that the fingerprint of the right index finger (namely, the first fingerprint) stays on the fingerprint sensor.

At block 105, a size of the screen display area is adjusted according to the recorded time period of the first fingerprint.

In specific implementations, the terminal can set a corresponding size of the screen display area according to the time period that the first fingerprint stays on the fingerprint sensor. For example, if the time period that the first fingerprint stays on the fingerprint sensor is one second, the size of the screen display area can be set to 75% of the screen size; if the time period that the first fingerprint stays on the fingerprint sensor is two second, the size of the screen display area can be set to 50% of the screen size; if the time period that the first fingerprint stays on the fingerprint sensor is three second, the size of the screen display area can be set to 100% of the screen size. So that the terminal can adjust the size of the screen display area according to the acquired time period that the first fingerprint stays on the fingerprint sensor.

By means of implementations of the present disclosure, an authority fingerprint is acquired, and the authority fingerprint is a fingerprint having the authority of changing a screen display direction; when a first fingerprint is acquired, it is judged whether the first fingerprint is the authority fingerprint, if so, an input direction of the first fingerprint is acquired and the screen display direction is adjusted according to the input direction of the first fingerprint. Besides, the authority fingerprint for changing the screen direction can be preset. When the first fingerprint is acquired, if the first fingerprint is the authority fingerprint, the screen display direction is adjusted according to the input direction of the first fingerprint, so that a timing for adjusting the screen display direction can be judged accurately, and the accuracy of adjusting the screen display direction can be improved.

Figure 2:
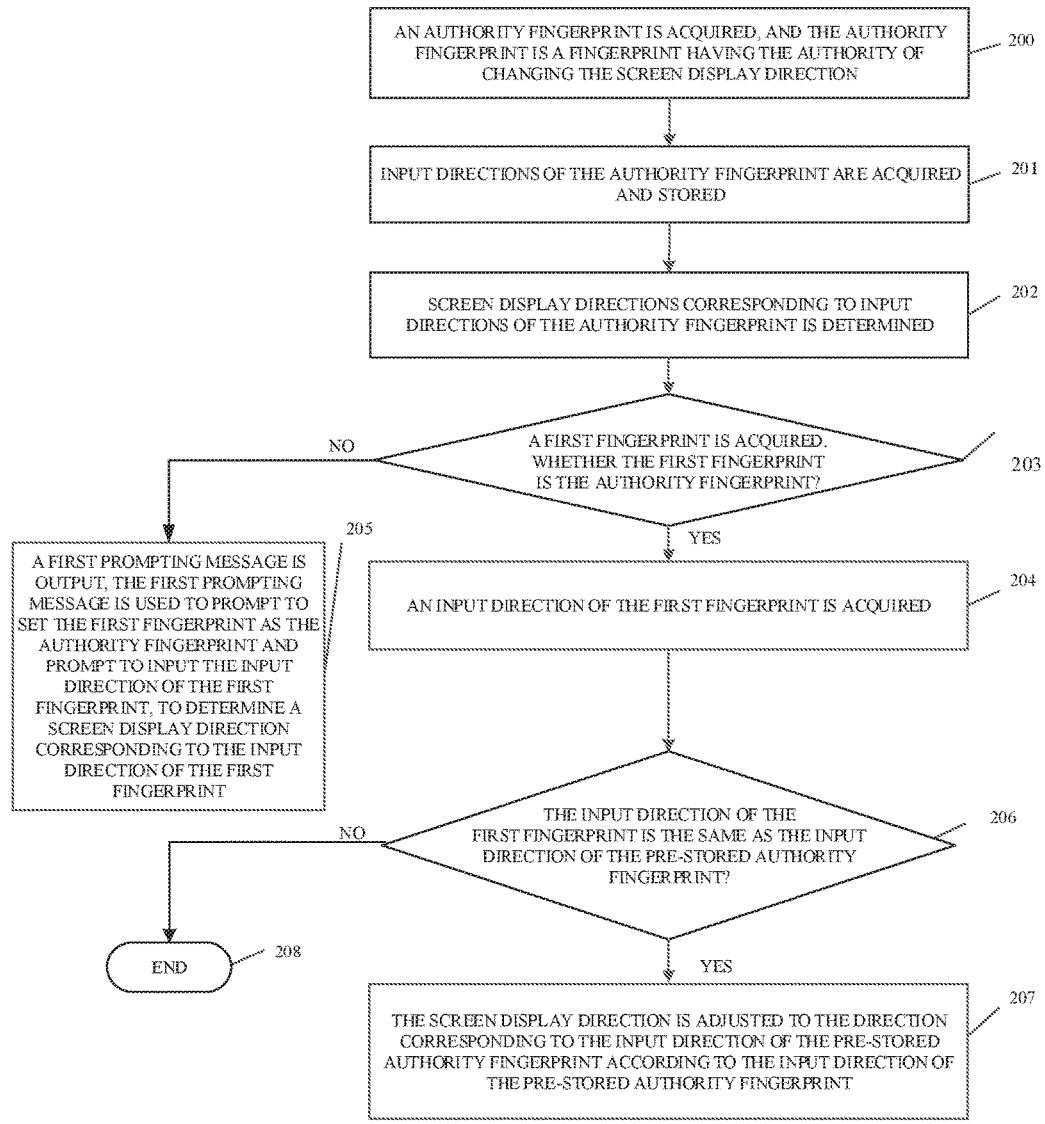
FIG. 2 is a schematic flowchart illustrating another implementation of the method for adjusting a screen display direction of the present disclosure.

Referring to FIG. 2, FIG. 2 is a schematic flowchart illustrating another implementation of the method for adjusting a screen display direction of the present disclosure. Methods according to implementations of the present disclosure can be implemented by a terminal, which can be a mobile phone, tablet PC, laptop, pocket PC, mobile internet device (MID), wearable device (such as a smart watch, smart bracelet, pedometer and the like) or other terminals whose screen display direction can be adjusted.

As illustrated in FIG. 2, a method for adjusting a screen display direction according to another implementation of the present disclosure can begin at block 200.

At block 200, an authority fingerprint is acquired, and the authority fingerprint is a fingerprint having the authority of changing the screen display direction.

In specific implementations, the terminal can acquire at least one fingerprint, for example, the terminal can acquire a second fingerprint and a third fingerprint input by a first user, and the first user can be a user to whom the terminal belongs. The second fingerprint acquired by the terminal can be a fingerprint of the right index finger, the third fingerprint can be a fingerprint of the left index finger. The terminal can also set the second fingerprint as the authority fingerprint according to settings of the first user, the authority fingerprint has the authority of changing the screen display direction. When the fingerprint of the right index finger of the first user is recognized, the terminal enters a state of changing the screen display direction.

As an implementation, the terminal can also set the third fingerprint as a fingerprint having other functional authorities according to settings of the user.

As an implementation, the terminal can receive fingerprints input by other users, these fingerprints also have the authority of changing the screen display direction. For example, the terminal can receive a fourth fingerprint input by a second user, and set the fourth fingerprint as a fingerprint having the authority of changing the screen display direction according to settings of any user (the first user or the second user). The terminal can also receive a fifth fingerprint input by a third user, and set the fifth fingerprint as a fingerprint having the authority of changing the screen display direction according to settings of any user (the first user, the second user or the third user). Screen display direction changed by different authority fingerprints varies, and the details can be set according to settings of users.

As an implementation, the terminal can acquire a fingerprint via a fingerprint sensor. The manner of acquiring fingerprints by the fingerprint sensor of this implementation can be sliding. Because of the small occupied area, a sliding fingerprint sensor is more flexible for product design, so that it is widely deployed on a variety of smaller electronic terminals. When a finger of the user slides over the surface of the fingerprint sensor, the terminal can acquire clear fingerprint details, seize fingerprint features and acquire input directions of a fingerprint via scanning or a series of snapshots.

At block 201, input directions of the authority fingerprint are acquired and stored.

In specific implementations, take the case where the terminal sets the second fingerprint input by the first user to be the authority fingerprint as an example. After setting the second fingerprint input by the first user to be the authority fingerprint, the terminal can acquire different input directions of the second fingerprint and then set corresponding screen display directions according to different input directions of the second fingerprint.

At block 202, screen display directions corresponding to input directions of the authority fingerprint are determined.

Figure 3:
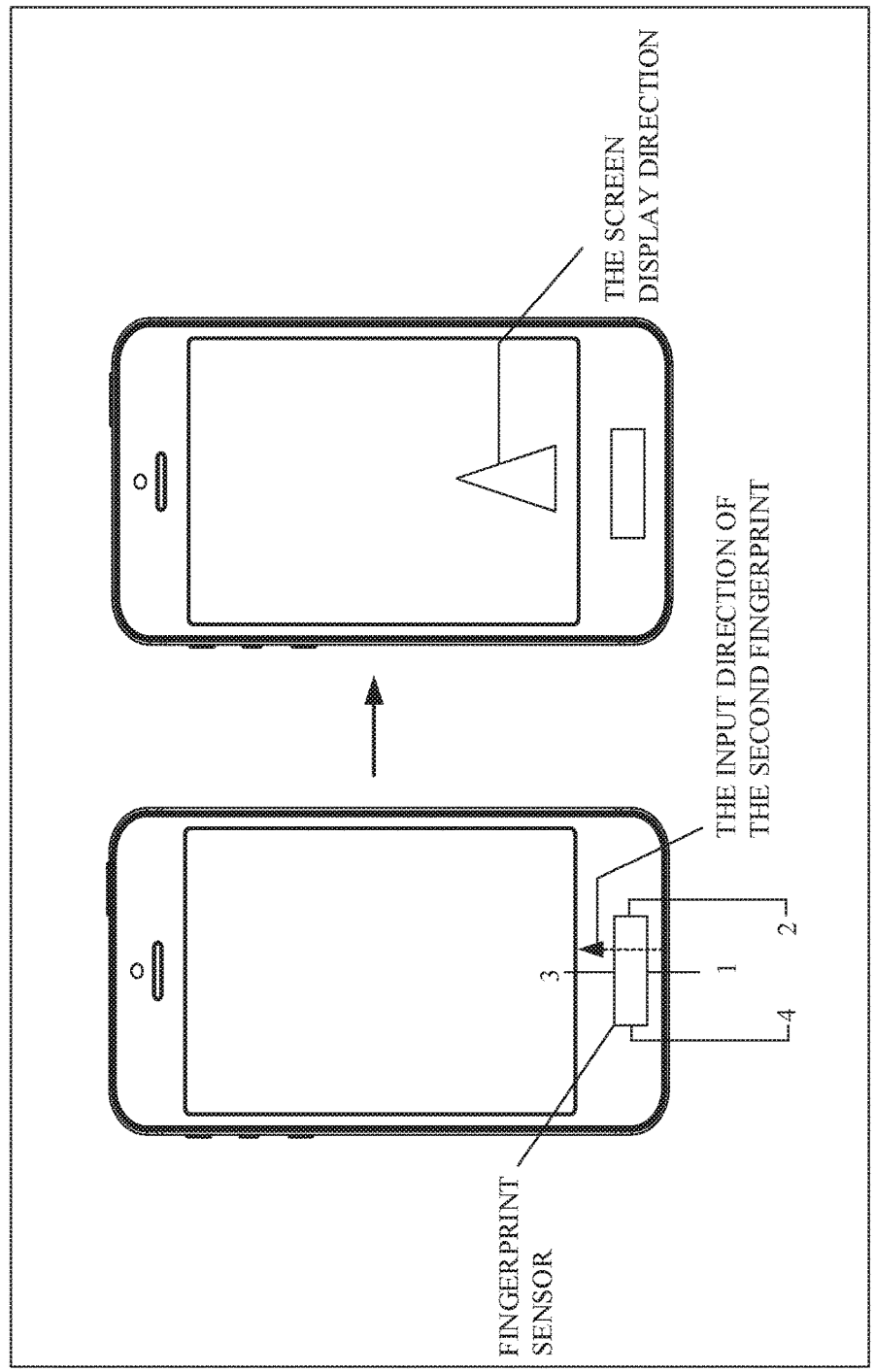
FIG. 3 is a schematic diagram illustrating a scene of adjusting a screen display direction of another implementation of the method for adjusting a screen display direction of the present disclosure.
Figure 4:
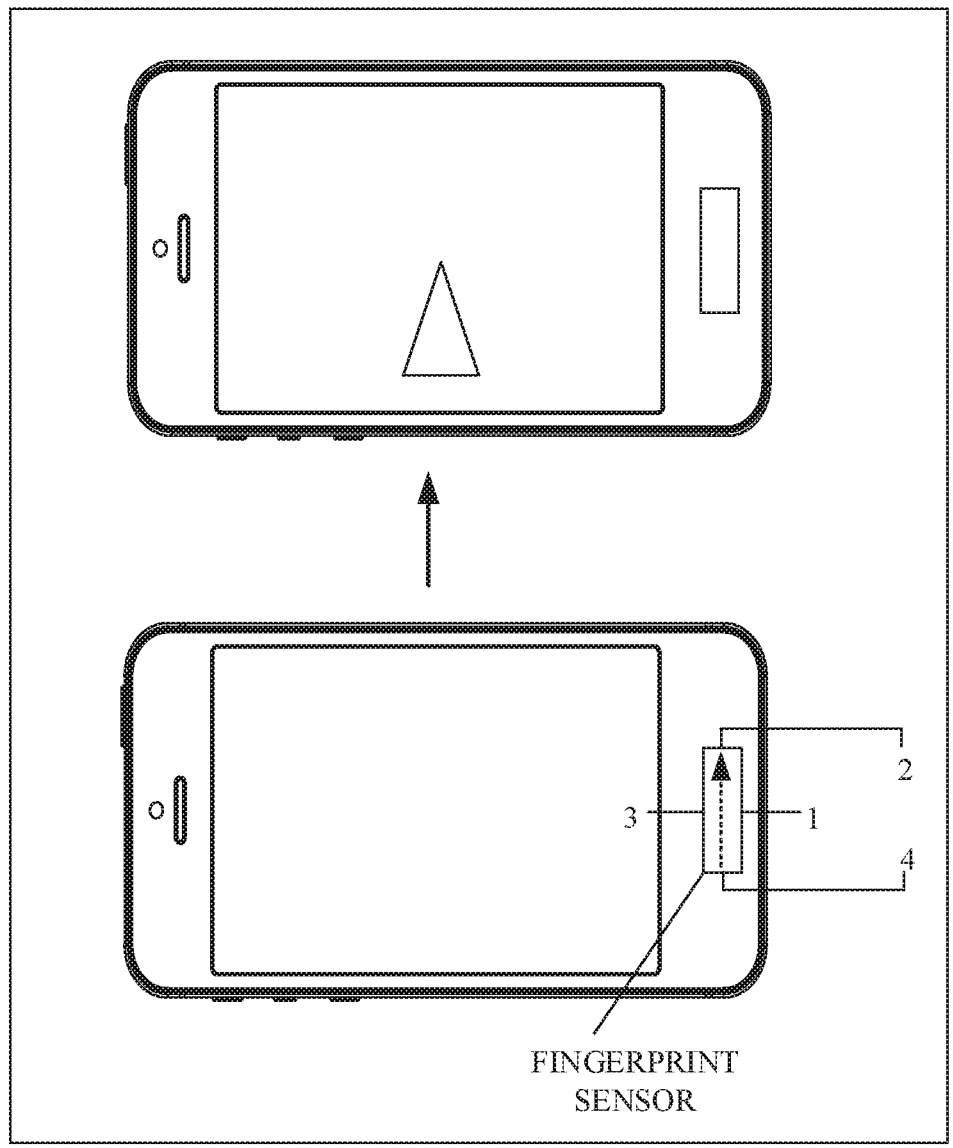
FIG. 4 is another schematic diagram illustrating a scene of adjusting a screen display direction of another implementation of the method for adjusting a screen display direction of the present disclosure.
Figure 5:
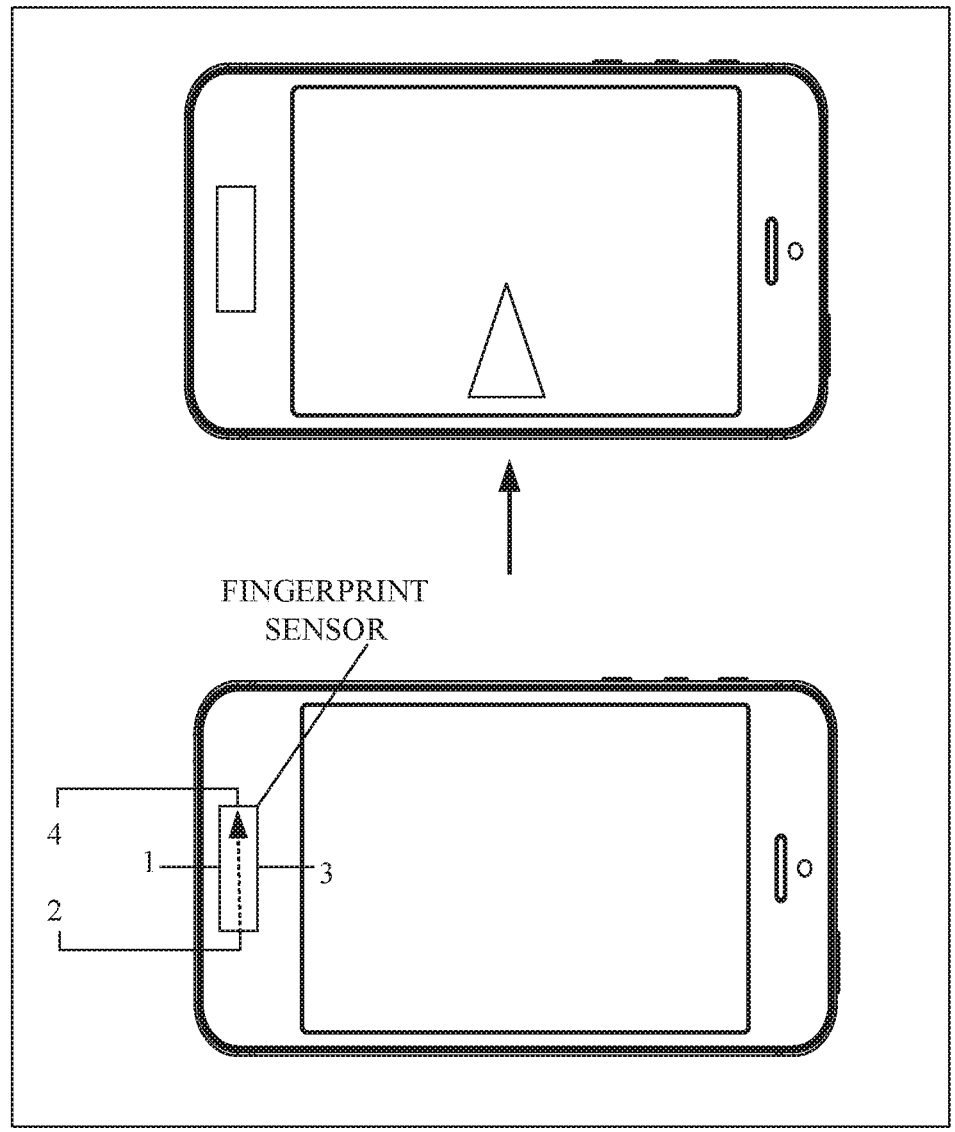
FIG. 5 is another schematic diagram illustrating a scene of adjusting a screen display direction of another implementation of the method for adjusting a screen display direction of the present disclosure.
Figure 6:
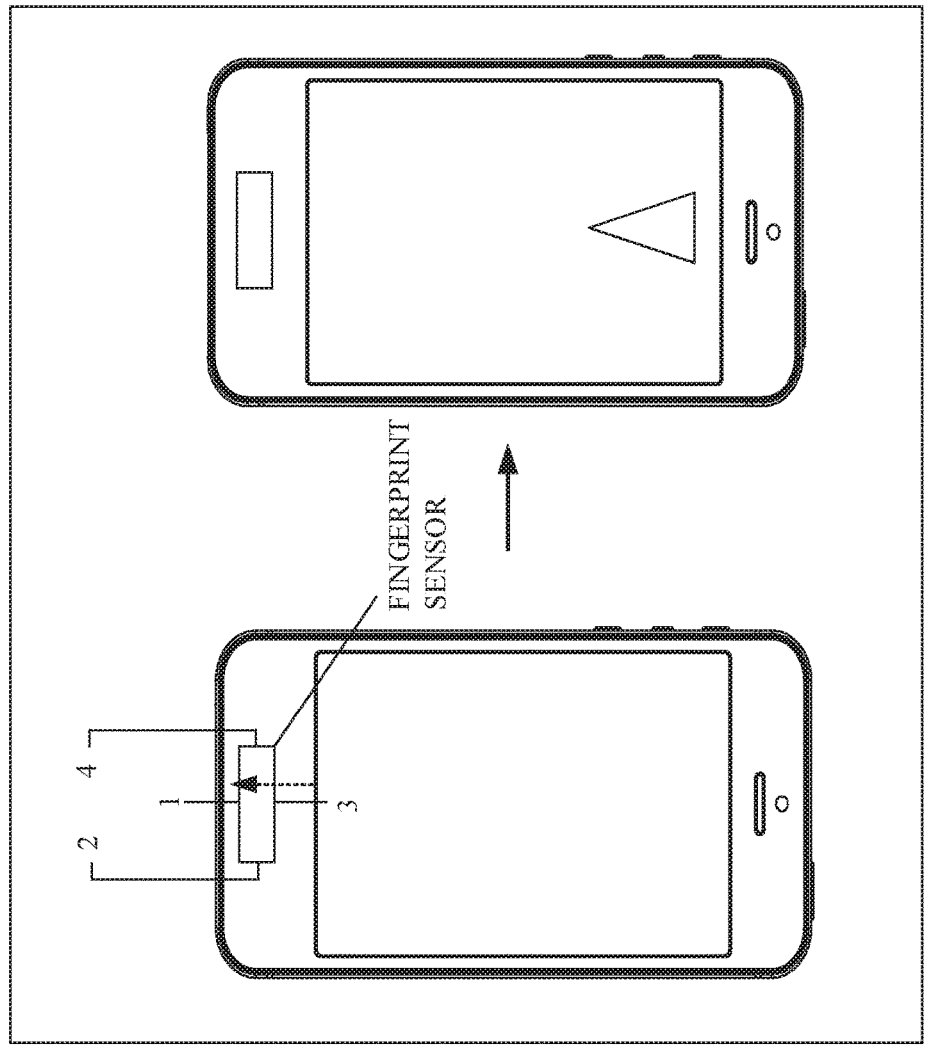
FIG. 6 is another schematic diagram illustrating a scene of adjusting screen display direction of another implementation of the method for adjusting a screen display direction of the present disclosure.

In specific implementations, as illustrated in FIG. 3, if the input direction of the second fingerprint on the fingerprint sensor is sliding from the first end of the fingerprint sensor to the third end of the fingerprint sensor, the corresponding screen display direction can be set as the vertical direction towards the third end of the fingerprint sensor. As illustrated in FIG. 4, if the input direction of the second fingerprint on the fingerprint sensor is sliding from the fourth end of the fingerprint sensor to the second end of the fingerprint sensor, the corresponding screen display direction can be set as the vertical direction towards the second end of the fingerprint sensor. As illustrated in FIG. 5, if the input direction of the second fingerprint on the fingerprint sensor is sliding from the second end of the fingerprint sensor to the fourth end of the fingerprint sensor, the corresponding screen display direction can be set as the vertical direction towards the fourth end of the fingerprint sensor. As illustrated in FIG. 6, if the input direction of the second fingerprint on the fingerprint sensor is sliding from the third end of the fingerprint sensor to the first end of the fingerprint sensor, the corresponding screen display direction can be set as the vertical direction towards the first end of the fingerprint sensor.

It should be noted that the above-mentioned process of setting different corresponding screen display directions for different input directions of the second fingerprint is only an example, the implementations of the present disclosure have no restriction on the correspondence between input directions of fingerprints and screen display directions. For example, if the input direction of the second fingerprint on the fingerprint sensor is sliding from the first end of the fingerprint sensor to the third end of the fingerprint sensor, the corresponding screen display direction can also be set as one of a vertical direction towards the second end of the fingerprint sensor, the vertical direction towards the fourth end of the fingerprint sensor, and the vertical direction towards the first end of the fingerprint sensor.

At block 203, a first fingerprint is acquired; when the first fingerprint is the authority fingerprint, the terminal proceeds to block 204; otherwise, the terminal proceeds to block 205.

In specific implementations, when the first fingerprint is acquired, it is judged whether the first fingerprint is the authority fingerprint.

In specific implementations, after the terminal acquires authority fingerprints and determines screen display directions corresponding to the authority fingerprints, the fingerprint sensor can enter a sleep state; in this situation, the system power consumption of the fingerprint sensor is at microampere level, and it has minimal effects on system efficiency. When the first user inputs the first fingerprint to the fingerprint sensor of the terminal, the fingerprint sensor recovers from the sleep state to an operating state immediately. In this situation, a chip of the fingerprint sensor or a fingerprint identification software module of the fingerprint sensor acquires clear fingerprint details and seize fingerprint features via scanning or a series of snapshots. When the first fingerprint has been acquired, the terminal judges whether the first fingerprint is the authority fingerprint according to seized fingerprint features, namely, judges whether the first fingerprint is one of the second fingerprint input by the first user, the fourth fingerprint input by the second user, and the fifth fingerprint input by the third user and therefore has the authority of changing the screen display direction; if so, the terminal acquires an input direction of the first fingerprint; otherwise, the terminal prompts to set the first fingerprint to be the authority fingerprint. For example, when the first fingerprint has been acquired, the terminal compares the first fingerprint with the pre-stored second fingerprint, the pre-stored fourth fingerprint, and the pre-stored fifth fingerprint one by one, if the first fingerprint is the same as one of the pre-stored authority fingerprints (for example, the first fingerprint is the same as the second fingerprint of the authority fingerprints), an input direction of the first fingerprint is acquired; otherwise, the terminal prompts to set the first fingerprint to be the authority fingerprint; alternatively, the terminal will not perform any operation about changing the screen display direction, or the terminal judges whether the first fingerprint is a fingerprint having other functions.

At block 204, an input direction of the first fingerprint is acquired.

In specific implementations, after determining that the first fingerprint is the authority fingerprint, the terminal further acquires a sliding direction of the finger of the user, namely the input direction of the first fingerprint.

At block 205, a first prompting message is an output, the first prompting message can be used to prompt to set the first fingerprint as the authority fingerprint and prompt to input the input direction of the first fingerprint so as to determine a screen display direction corresponding to the input direction of the first fingerprint.

In specific implementations, if judging that the first fingerprint is not one of the pre-stored second fingerprint, the pre-stored fourth fingerprint, and the pre-stored fifth fingerprint and therefore is not the authority fingerprint, the terminal outputs the first prompting message, so as to prompt the user to set the first fingerprint as the authority fingerprint and then acquire the input direction of the first fingerprint, so that a screen display direction corresponding to the input direction of the first fingerprint can be determined.

At block 206, when the input direction of the first fingerprint is the same as a pre-stored input direction of the authority fingerprint, the terminal proceeds to block 207; otherwise, the terminal proceeds to block 208.

In specific implementations, it is judged whether the input direction of the first fingerprint is the same as the input direction of the pre-stored authority fingerprint.

Figure 7:
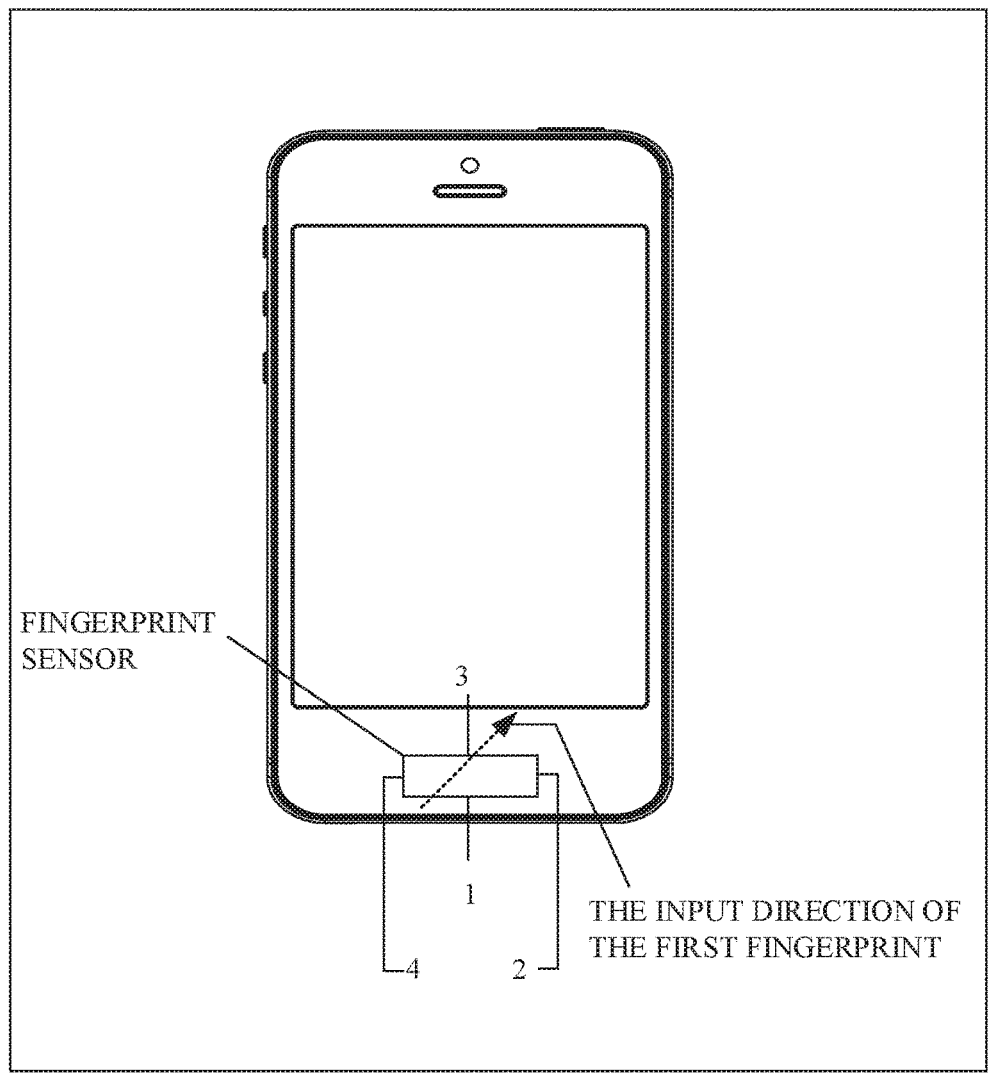
FIG. 7 is a schematic diagram illustrating an input direction of a first fingerprint of another implementation of the method for adjusting a screen display direction of the present disclosure.

In specific implementations, after acquiring the input direction of the first fingerprint, the terminal judges whether the input direction of the first fingerprint is one of the input directions of the second fingerprint illustrated in FIG. 3 to FIG. 6, if so, the terminal proceeds to block 207 to look for a screen display direction corresponding to the input direction of the second fingerprint; otherwise, such as illustrated in FIG. 7, the input direction of the first fingerprint is an angular direction between the second end of the fingerprint sensor and the third end of the fingerprint sensor, the terminal proceeds to block 208 and the process ends.

At block 207, the screen display direction is adjusted to a direction corresponding to the input direction of the pre-stored authority fingerprint according to the input direction of the pre-stored authority fingerprint.

In specific implementations, since the first fingerprint is the same as the pre-stored second fingerprint, after acquiring the input direction of the first fingerprint, the terminal matches the input direction of the first fingerprint with the input direction of the pre-stored second fingerprint, and then finds a corresponding screen display direction according to the matching input direction of the second fingerprint. For example, after matching by the terminal, if the input direction of the first fingerprint is the same as the input direction of the second fingerprint illustrated in FIG. 4, namely, if the input direction of the first fingerprint is sliding from the fourth end of the fingerprint sensor to the second end of the fingerprint sensor, the corresponding screen display direction is the vertical direction towards the second end of the fingerprint sensor, so that the terminal adjusts the current screen display direction to the vertical direction towards the second end of the fingerprint sensor.

At block 208, the process ends.

In specific implementations, it is judged at block 206 that the input direction of the first fingerprint is not the same as the input direction of the pre-stored authority fingerprint, the process ends, the terminal stops looking for the screen display direction corresponding to the input direction of the first fingerprint, and the terminal can prompt the first user to enter the first fingerprint again, or the terminal can look for other function options corresponding to this input direction and execute operations corresponding to other function options.

By means of implementations of the present disclosure, an authority fingerprint is acquired, and the authority fingerprint is a fingerprint having the authority of changing a screen display direction; when a first fingerprint is acquired, it is judged whether the first fingerprint is the authority fingerprint, if so, an input direction of the first fingerprint is acquired and the screen display direction is adjusted according to the input direction of the first fingerprint. Besides, the authority fingerprint for changing the screen direction can be preset. When the first fingerprint is acquired, if the first fingerprint is the authority fingerprint, the screen display direction is adjusted according to the input direction of the first fingerprint, so that a timing for adjusting the screen display direction can be judged accurately, and the accuracy of adjusting the screen display direction can be improved.

Comparing FIG. 2 with FIG. 1, the operations at block 200, block 203, and block 204 of FIG. 2 can correspond to those at block 100, block 101, and block 102 of FIG. 1 respectively, and on the basis of FIG. 1, FIG. 2 further provides an implementation for the screen display direction adjustment. In the method illustrated in FIG. 2, the input directions of the authority fingerprint are acquired and stored, and screen display directions corresponding to input directions of the authority fingerprint are determined. Subsequently, the screen display direction adjustment can be accomplished based on the comparison between the input direction of the authority fingerprint and the input direction of the first fingerprint.

Besides, in the method illustrated in FIG. 2, the input direction of the first fingerprint should match with the input direction of the pre-stored authority fingerprint in order to accomplish the screen display direction adjustment, so as to avoid triggering the screen display direction adjustment accidentally.

Figure 8:
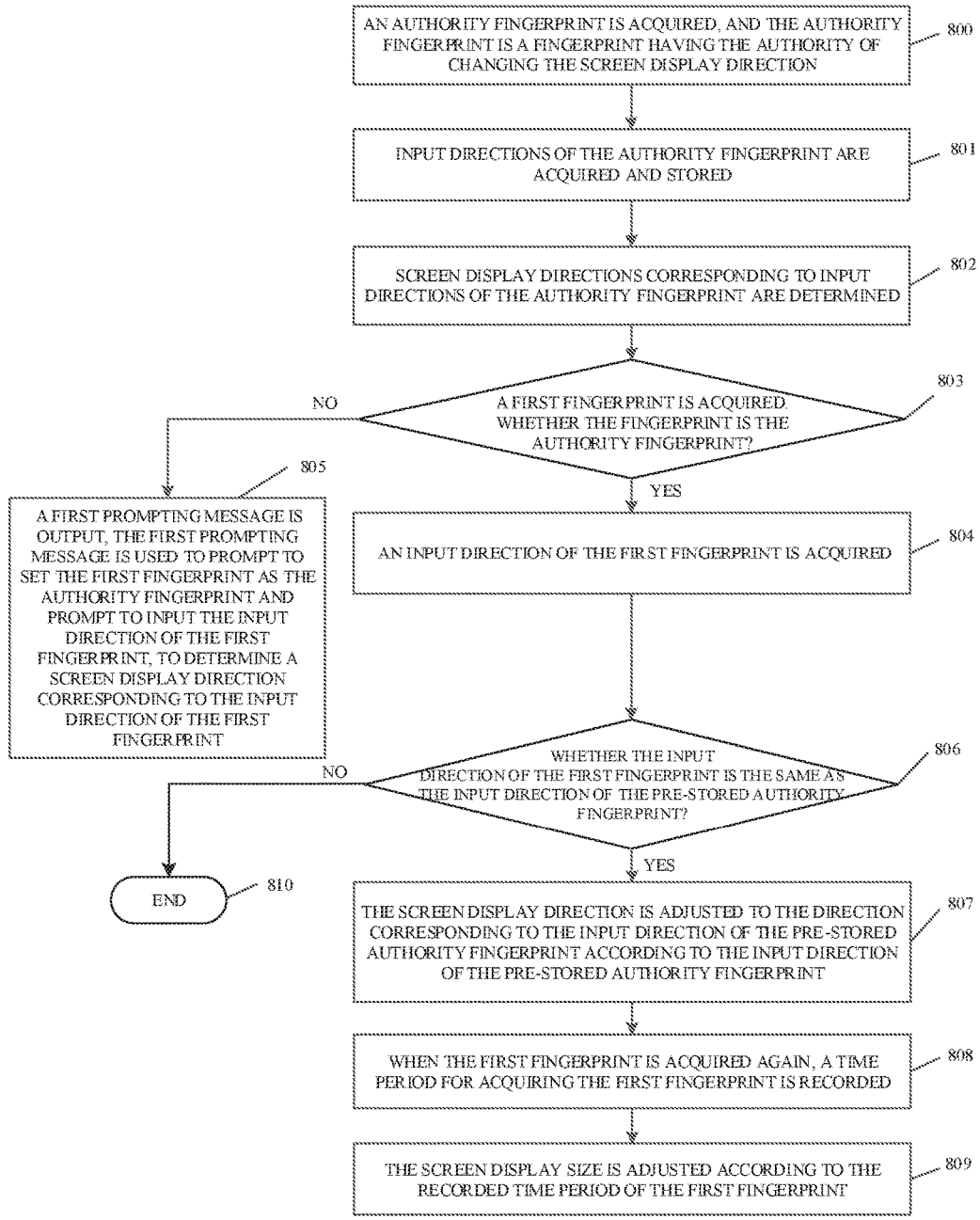
FIG. 8 is a schematic flowchart illustrating another implementation of the method for adjusting a screen display direction of the present disclosure.

Referring to FIG. 8, FIG. 8 is a schematic flowchart illustrating another implementation of a method for adjusting a screen display direction of the present disclosure. Methods according to implementations of the present disclosure can be implemented by a terminal, which can be a mobile phone, tablet PC, laptop, pocket PC, mobile internet device (MID), wearable device (such as a smart watch, smart bracelet, pedometer and the like) or other terminals whose screen display direction can be adjusted.

As illustrated in FIG. 8, a method for adjusting a screen display direction according to another implementation of the present disclosure can begin at block 800.

At block 800, an authority fingerprint is acquired, and the authority fingerprint is a fingerprint having the authority of changing the screen display direction.

In specific implementations, the terminal can acquire at least one fingerprint, for example, the terminal can acquire a second fingerprint and a third fingerprint input by a first user, and the first user can be a user to whom the terminal belongs. And the second fingerprint acquired by the terminal can be a fingerprint of the right index finger, the third fingerprint can be a fingerprint of the left index finger. The terminal can also set the second fingerprint as the authority fingerprint according to settings of the first user, the authority fingerprint has the authority of changing the screen display direction. When the fingerprint of the right index finger of the first user is recognized, the terminal enters a state of changing the screen display direction.

At block 801, input directions of the authority fingerprint are acquired and stored.

In specific implementations, take the case where the terminal sets the second fingerprint input by the first user as the authority fingerprint as an example, after setting the second fingerprint input by the first user as the authority fingerprint, the terminal can acquire different input directions of the second fingerprint, and then, set corresponding screen display directions according to input directions of the second fingerprint.

At block 802, screen display directions corresponding to input directions of the authority fingerprint is determined.

In specific implementations, as illustrated in FIG. 3, if the input direction of the second fingerprint on the fingerprint sensor is sliding from the first end of the fingerprint sensor to the third end of the fingerprint sensor, the corresponding screen display direction can be set as the vertical direction towards the third end of the fingerprint sensor. As illustrated in FIG. 4, if the input direction of the second fingerprint on the fingerprint sensor is sliding from the fourth end of the fingerprint sensor to the second end of the fingerprint sensor, the corresponding screen display direction can be set as the vertical direction towards the second end of the fingerprint sensor. As illustrated in FIG. 5, if the input direction of the second fingerprint on the fingerprint sensor is sliding from the second end of the fingerprint sensor to the fourth end of the fingerprint sensor, the corresponding screen display direction can be set as the vertical direction towards the fourth end of the fingerprint sensor. As illustrated in FIG. 6, if the input direction of the second fingerprint on the fingerprint sensor is sliding from the third end of the fingerprint sensor to the first end of the fingerprint sensor, the corresponding screen display direction can be set as the vertical direction towards the first end of the fingerprint sensor.

It is noted that the above-mentioned process of setting screen display directions corresponding to different input directions of the second fingerprint is only an example, implementations of the present disclosure set no restriction on the corresponding relation between input directions of fingerprints and screen display directions. For example, if the input direction of the second fingerprint on the fingerprint sensor is sliding from the first end of the fingerprint sensor to the third end of the fingerprint sensor, the corresponding screen display direction can also be set as any direction of the vertical direction towards the second end of the fingerprint sensor, the vertical direction towards the fourth end of the fingerprint sensor and the vertical direction towards the first end of the fingerprint sensor.

At block 803, a first fingerprint is acquired; when the first fingerprint is the authority fingerprint, the terminal proceeds to block 804, otherwise, the terminal proceeds to block 805.

In specific implementations, when the first fingerprint is acquired, it is judged whether the first fingerprint is the authority fingerprint.

In specific implementations, after the terminal acquires authority fingerprints and determines screen display directions corresponding to the authority fingerprints, the fingerprint sensor can enter a sleep state; in this situation, the system power consumption of the fingerprint sensor is at microampere level, and it has minimal effects on system efficiency. When the first user inputs the first fingerprint to the fingerprint sensor of the terminal, the fingerprint sensor recovers from the sleep state to an operating state immediately. In this situation, a chip of the fingerprint sensor or a fingerprint identification software module of the fingerprint sensor acquires clear fingerprint details and seize fingerprint features via scanning or a series of snapshots. When the first fingerprint has been acquired, the terminal judges whether the first fingerprint is the authority fingerprint according to seized fingerprint features, namely, judges whether the first fingerprint is one of the second fingerprint input by the first user, the fourth fingerprint input by the second user, and the fifth fingerprint input by the third user and therefore has the authority of changing the screen display direction; if so, the terminal acquires an input direction of the first fingerprint; otherwise, the terminal prompts to set the first fingerprint as the authority fingerprint. For example, when acquiring the first fingerprint, the terminal compares the first fingerprint with the preset second fingerprint, the preset fourth fingerprint and the preset fifth fingerprint one by one, if the first fingerprint is the same as one of the authority fingerprints (for example, the first fingerprint is the same as the second fingerprint of authority fingerprints), an input direction of the first fingerprint is acquired; otherwise, the terminal prompts to set the first fingerprint as the authority fingerprint; optionally, the terminal will not perform any operation about changing the screen display direction or the terminal judges whether the first fingerprint is a fingerprint having other functions.

At block 804, an input direction of the first fingerprint is acquired.

In specific implementations, after determining that the first fingerprint is the authority fingerprint, the terminal further acquires a sliding direction of the finger of the user, namely the input direction of the first fingerprint.

At block 805, a first prompting message is an output, the first prompting message can be used to prompt to set the first fingerprint as the authority fingerprint and prompt to input the input direction of the first fingerprint so as to determine a screen display direction corresponding to the input direction of the first fingerprint.

In specific implementations, if judging that the first fingerprint is not an authority fingerprint of the pre-stored second fingerprint, the pre-stored fourth fingerprint or the pre-stored fifth fingerprint, the terminal outputs the first prompting message, so as to prompt the user to set the first fingerprint as the authority fingerprint and then acquire the input direction of the first fingerprint, so that a screen display direction corresponding to the input direction of the first fingerprint can be determined.

At block 806, when the input direction of the first fingerprint is the same as the input direction of the pre-stored authority fingerprint, the terminal proceeds to block 807; otherwise, the terminal proceeds to block 810.

In specific implementations, after acquiring the input direction of the first fingerprint, the terminal judges whether the input direction of the first fingerprint is one of the input directions of the second fingerprint illustrated in FIG. 3 to FIG. 6, if so, the terminal proceeds to block 807, and finds a screen display direction corresponding to the input direction of the second fingerprint; otherwise, such as illustrated in FIG. 7, the input direction of the first fingerprint is an angular direction between the second end of the fingerprint sensor and the third end of the fingerprint sensor, the terminal proceeds to block 810 and the process ends.

At block 807, when the input direction of the first fingerprint is the same as the input direction of the pre-stored authority fingerprint, the screen display direction is adjusted to a direction corresponding to the input direction of the pre-stored authority fingerprint according to the input direction of the pre-stored authority fingerprint.

In specific implementations, since the first fingerprint is the same as the pre-stored second fingerprint, after acquiring the input direction of the first fingerprint, the terminal matches the input direction of the first fingerprint with the input direction of the pre-stored second fingerprint, and then finds a corresponding screen display direction according to the matching input direction of the second fingerprint. For example, after matching by the terminal, if the input direction of the first fingerprint is the same as the input direction of the second fingerprint illustrated in FIG. 4, namely, if the input direction of the first fingerprint is sliding from the fourth end of the fingerprint sensor to the second end of the fingerprint sensor, the corresponding screen display direction is the vertical direction towards the second end of the fingerprint sensor, so that the terminal adjusts the current screen display direction to the vertical direction towards the second end of the fingerprint sensor.

At block 808, when the first fingerprint is acquired again, a time period for acquiring the first fingerprint is recorded.

In specific implementations, after adjusting the screen display direction, if the first fingerprint is acquired again, the terminal records a time period that the first fingerprint stays on the fingerprint sensor. For example, the first user can keep the right index finger pressing the fingerprint sensor, such that the fingerprint sensor can record the time period that the fingerprint of the right index finger (namely, the first fingerprint) stays on the fingerprint sensor.

At block 809, the size of the screen display area is adjusted according to the recorded time period of the first fingerprint.

In specific implementations, the terminal can set a corresponding size of the screen display area according to the time period that the first fingerprint stays on the fingerprint sensor. For example, if the time period that the first fingerprint stays on the fingerprint sensor is one second, the size of the screen display area can be set to 75% of the screen size; if the time period that the first fingerprint stays on the fingerprint sensor is two second, the size of the screen display area can be set to 50% of the screen size; if the time period that the first fingerprint stays on the fingerprint sensor is three second, the size of the screen display area can be set to 100% of the screen size. So that the terminal can adjust the size of the screen display area according to the acquired time period that the first fingerprint stays on the fingerprint sensor.

At block 810, the process ends.

In specific implementations, it is judged at block 806 that the input direction of the first fingerprint is not the same as the input direction of the pre-stored authority fingerprint, the process ends, the terminal stops looking for the screen display direction corresponding to the input direction of the first fingerprint, and the terminal can prompt the first user to enter the first fingerprint again, or the terminal can look for other function options corresponding to this input direction and execute operations corresponding to other function options.

By means of implementations of the present disclosure, an authority fingerprint is acquired, and the authority fingerprint is a fingerprint having the authority of changing a screen display direction; when a first fingerprint is acquired, it is judged whether the first fingerprint is the authority fingerprint, if so, an input direction of the first fingerprint is acquired and the screen display direction is adjusted according to the input direction of the first fingerprint. Besides, the authority fingerprint for changing the screen direction can be preset. When the first fingerprint is acquired, if the first fingerprint is the authority fingerprint, the screen display direction is adjusted according to the input direction of the first fingerprint, so that a timing for adjusting the screen display direction can be judged accurately, and the accuracy of adjusting the screen display direction can be improved.

Comparing FIG. 8 with FIG. 2, the operations at block 800 through block 807 of FIG. 8 can correspond to those of block 200 through block 207 of FIG. 2 respectively. In the method illustrated in FIG. 8, when the first fingerprint is acquired again, a time period for acquiring the first fingerprint is recorded and the size of the screen display area can be adjusted according to the recorded time period of the first fingerprint.

Figure 9A:
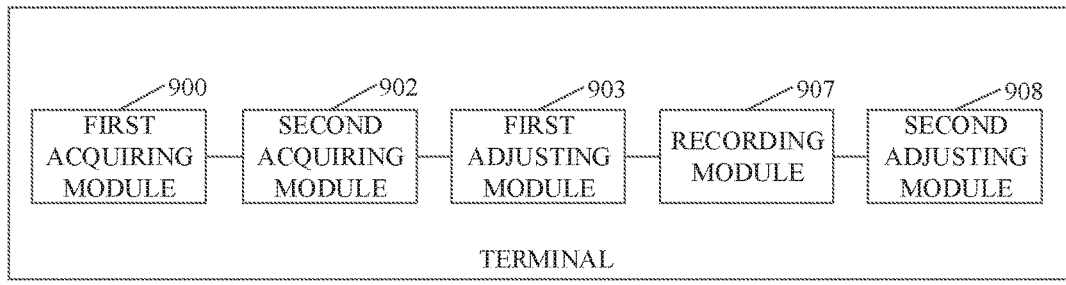
FIG. 9A is a schematic block diagram illustrating a terminal of an implementation of the present disclosure.

Referring to FIG. 9A, FIG. 9A is a schematic block diagram illustrating a terminal of an implementation of the present disclosure. The terminal illustrated in FIG. 9A includes a first acquiring module 900 (such as a fingerprint sensor or other input device), a second acquiring module 902 (such as a motion sensor or a fingerprint sensor), a first adjusting module 903 (such as a processor), a recording module 907 (such as a memory unit) and a second adjusting module 908 (such as a processor). And the first acquiring module 900 and the second acquiring module 902 can be integrated into one sensor unit, for example, in a fingerprint sensor.

The first acquiring module 900 is configured to acquire one or more authority fingerprints (in the following, take one authority fingerprint as an example), and the authority fingerprint is a fingerprint having the authority of changing a screen display direction; the first acquiring module 900 is further configured to acquire a first fingerprint.

The second acquiring module 902 is configured to acquire, when the first fingerprint is the authority fingerprint, an input direction of the first fingerprint if the first judging module judges that the first fingerprint is the authority fingerprint.

The first adjusting module 903 is configured to adjust the screen display direction according to the input direction of the first fingerprint.

The recording module 907 is configured to record a time period for acquiring the first fingerprint when the first fingerprint is acquired again.

The second adjusting module 908 is configured to adjust the size of the screen display area according to the time period for acquiring the first fingerprint recorded by the recording module 907.

In specific implementations, the terminal can acquire at least one fingerprint, for example, the terminal can acquire a second fingerprint and a third fingerprint input by a first user, and the first user can be a user to whom the terminal belongs. And the second fingerprint acquired by the terminal can be a fingerprint of the right index finger, the third fingerprint can be a fingerprint of the left index finger. The terminal can also set the second fingerprint as the authority fingerprint according to settings of a user, the authority fingerprint has the authority of changing the screen display direction. When the fingerprint of the right index finger of the first user is recognized, the terminal enters a state of changing the screen display direction.

In specific implementations, after the terminal acquires authority fingerprints and determines screen display directions corresponding to the authority fingerprints, the fingerprint sensor can enter a sleep state; in this situation, the system power consumption of the fingerprint sensor is at microampere level, and it has minimal effects on system efficiency. When the first user inputs the first fingerprint to the fingerprint sensor of the terminal, the fingerprint sensor recovers from the sleep state to an operating state immediately. In this situation, a chip of the fingerprint sensor or a fingerprint identification software module of the fingerprint sensor acquires clear fingerprint details and seize fingerprint features via scanning or a series of snapshot. When the first fingerprint has been acquired, the terminal judges whether the first fingerprint is the authority fingerprint according to seized fingerprint features, namely, judges whether the first fingerprint is one of the second fingerprint input by the first user, the fourth fingerprint input by the second user, and the fifth fingerprint input by the third user and therefore has the authority of changing the screen display direction; if so, the terminal acquires an input direction of the first fingerprint; otherwise, the terminal prompts to set the first fingerprint as the authority fingerprint. For example, when acquiring the first fingerprint, the terminal compares the first fingerprint with the preset second fingerprint, the preset fourth fingerprint and the preset fifth fingerprint one by one, if the first fingerprint is the same as one of the authority fingerprints (for example, the first fingerprint is the same as the second fingerprint of the authority fingerprints), an input direction of the first fingerprint is acquired; otherwise, the terminal prompts to set the first fingerprint as the authority fingerprint; optionally, the terminal will not perform any operation for changing the screen display direction or the terminal judges whether the first fingerprint is a fingerprint having other functions.

In specific implementations, after adjusting the screen display direction, if the first fingerprint is acquired again, the terminal records a time period that the first fingerprint stays on the fingerprint sensor. For example, the first user can keep the right index finger pressing the fingerprint sensor, such that to make the fingerprint sensor record the time period that the fingerprint of the right index finger (namely, the first fingerprint) stays on the fingerprint sensor.

In specific implementations, the terminal can set a corresponding size of the screen display area according to the time period that the first fingerprint stays on the fingerprint sensor. For example, if the time period that the first fingerprint stays on the fingerprint sensor is one second, the size of the screen display area can be set to 75% of the screen size; if the time period that the first fingerprint stays on the fingerprint sensor is two second, the size of the screen display area can be set to 50% of the screen size; if the time period that the first fingerprint stays on the fingerprint sensor is three second, the size of the screen display area can be set to 100% of the screen size. So that the terminal can adjust the size of the screen display area according to the acquired time period that the first fingerprint stays on the fingerprint sensor.

In specific implementations, after determining that the first fingerprint is the authority fingerprint, the terminal further acquires a sliding direction of the finger of the user, namely the input direction of the first fingerprint.

Figure 9B:
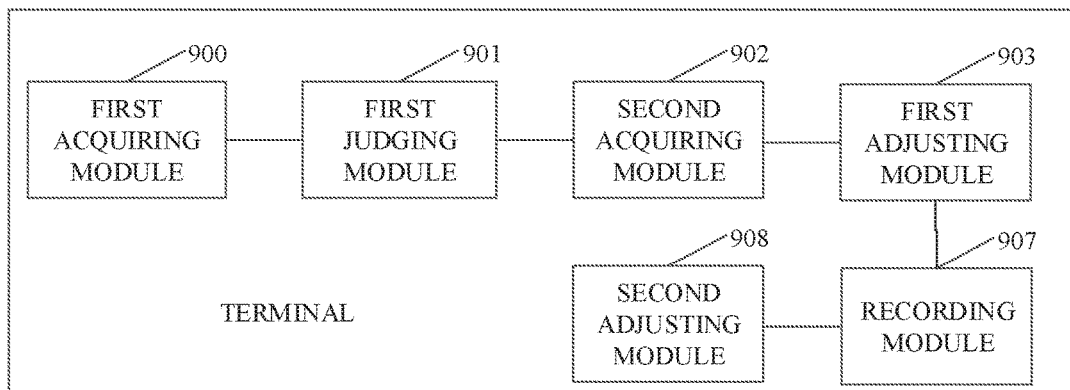
FIG. 9B is a schematic block diagram illustrating a terminal of an implementation of the present disclosure.

As an implementation, as illustrated in FIG. 9B, the terminal further includes a first judging module 901 (such as a processor), which is configured to judge whether the first fingerprint is the authority fingerprint when the first acquiring module 900 acquires the first fingerprint.

Figure 10:
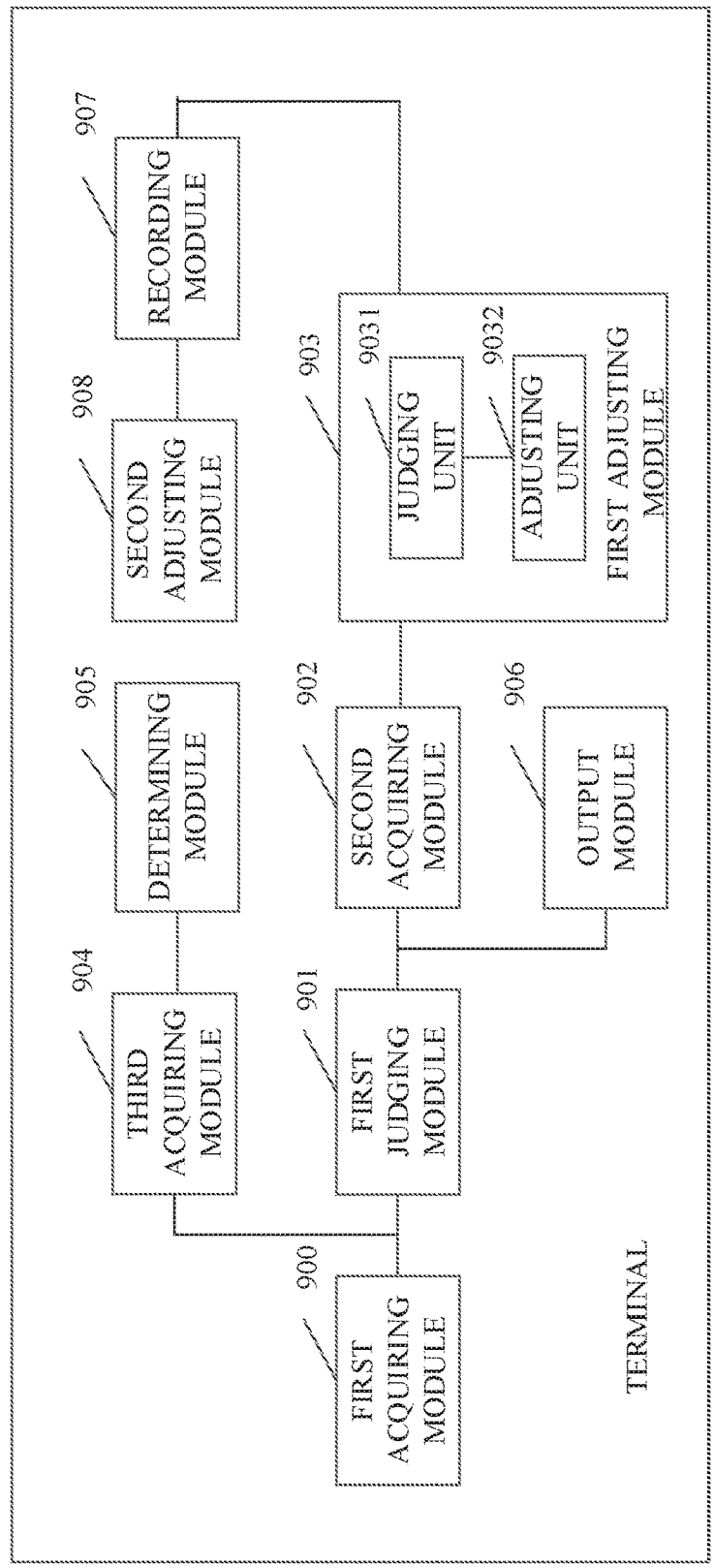
FIG. 10 is a schematic block diagram illustrating another terminal of an implementation of the present disclosure.

As an implementation, as illustrated in FIG. 10, the terminal further includes a third acquiring module 904 (such as a fingerprint sensor) and a determining module 905 (such as a processor).

The third acquiring module 904 is configured to acquire and store an input direction of the authority fingerprint. The determining module 905 is configured to determine a screen display direction corresponding to the input direction of the authority fingerprint.

In specific implementations, take the case where the terminal sets the second fingerprint input by the first user as the authority fingerprint as an example, after setting the second fingerprint input by the first user as the authority fingerprint, the terminal can acquire different input directions of the second fingerprint, and then, set corresponding screen display directions according to input directions of the second fingerprint.

In specific implementations, as illustrated in FIG. 3, if the input direction of the second fingerprint on the fingerprint sensor is sliding from the first end of the fingerprint sensor to the third end of the fingerprint sensor, the corresponding screen display direction can be set as the vertical direction towards the third end of the fingerprint sensor. As illustrated in FIG. 4, if the input direction of the second fingerprint on the fingerprint sensor is sliding from the fourth end of the fingerprint sensor to the second end of the fingerprint sensor, the corresponding screen display direction can be set as the vertical direction towards the second end of the fingerprint sensor. As illustrated in FIG. 5, if the input direction of the second fingerprint on the fingerprint sensor is sliding from the second end of the fingerprint sensor to the fourth end of the fingerprint sensor, the corresponding screen display direction can be set as the vertical direction towards the fourth end of the fingerprint sensor. As illustrated in FIG. 6, if the input direction of the second fingerprint on the fingerprint sensor is sliding from the third end of the fingerprint sensor to the first end of the fingerprint sensor, the corresponding screen display direction can be set as the vertical direction towards the first end of the fingerprint sensor.

It is noted that the above-mentioned process of setting screen display directions corresponding to different input directions of the second fingerprint is only an example, implementations of the present disclosure set no restriction on the corresponding relation between input directions of fingerprints and screen display directions. For example, if the input direction of the second fingerprint on the fingerprint sensor is sliding from the first end of the fingerprint sensor to the third end of the fingerprint sensor, the corresponding screen display direction can also be set as any direction of the vertical direction towards the second end of the fingerprint sensor, the vertical direction towards the fourth end of the fingerprint sensor and the vertical direction towards the first end of the fingerprint sensor.

As an implementation, as illustrated in FIG. 10, the terminal further includes an output module 906 (such as a display, a speaker and the like).

The output module 906 is configured to output a first prompting message if the first judging module judges that the first fingerprint is not the authority fingerprint, and the first prompting message can be used to prompt to set the first fingerprint as the authority fingerprint and prompt to input the input direction of the first fingerprint so as to determine a screen display direction corresponding to the input direction of the first fingerprint.

In specific implementations, if judging the first fingerprint is not an authority fingerprint of the preset second fingerprint, the preset fourth fingerprint or the preset fifth fingerprint, the terminal outputs the first prompting message, so as to prompt the user to set the first fingerprint as the authority fingerprint and then acquire the input direction of the first fingerprint, so that a screen display direction corresponding to the input direction of the first fingerprint can be determined.

As an implementation, as illustrated in FIG. 10, the first adjusting module 903 includes a judging unit 9031 and an adjusting unit 9032.

The judging unit 9031 is configured to judge whether the input direction of the first fingerprint is the same as a pre-stored input direction of the authority fingerprint. The adjusting unit 9032 is configured to adjust, if the judging unit judges that the input direction of the first fingerprint is the same as the pre-stored input direction of the authority fingerprint, the screen display direction to a direction corresponding to the pre-stored input direction of the authority fingerprint according to the pre-stored input direction of the authority fingerprint.

In specific implementations, after acquiring the input direction of the first fingerprint, the terminal judges whether the input direction of the first fingerprint is one of the input directions of the second fingerprint illustrated in FIG. 3 to FIG. 6, if so, the terminal finds a screen display direction corresponding to the input direction of the first fingerprint; otherwise, such as illustrated in FIG. 7, the input direction of the first fingerprint is an angular direction between the second end of the fingerprint sensor and the third end of the fingerprint sensor, the process ends.

In specific implementations, because the first fingerprint is the same as the pre-stored second fingerprint, after acquiring the input direction of the first fingerprint, the terminal matches the input direction of the first fingerprint with the input direction of the pre-stored second fingerprint, and then finds a corresponding screen display direction according to the matching input direction of the second fingerprint. For example, if the terminal matches the input direction of the first fingerprint with the input direction of the second fingerprint illustrated in FIG. 4, namely, if the input direction of the first fingerprint is sliding from the fourth end of the fingerprint sensor to the second end of the fingerprint sensor, the corresponding screen display direction is the vertical direction towards the second end of the fingerprint sensor, so that the terminal adjusts the current screen display direction to the vertical direction towards the second end of the fingerprint sensor.

In specific implementations, after adjusting the screen display direction, if the first fingerprint is acquired again, the terminal records a time period that the first fingerprint stays on the fingerprint sensor. For example, the first user can keep the right index finger pressing the fingerprint sensor, such that to make the fingerprint sensor record the time period that the fingerprint of the right index finger (namely, the first fingerprint) stays on the fingerprint sensor.

In specific implementations, the terminal can set a corresponding size of the screen display area according to the time period that the first fingerprint stays on the fingerprint sensor. For example, if the time period that the first fingerprint stays on the fingerprint sensor is one second, the size of the screen display area can be set to 75% of the screen size; if the time period that the first fingerprint stays on the fingerprint sensor is two second, the size of the screen display area can be set to 50% of the screen size; if the time period that the first fingerprint stays on the fingerprint sensor is three second, the size of the screen display area can be set to 100% of the screen size. So that the terminal can adjust the size of the screen display area according to the acquired time period that the first fingerprint stays on the fingerprint sensor.

The terminal can further include a hardware processor, which is connected with a memory through a bus for example. One or more programs are stored in the memory, and the programs can be used to implement all or part of operations of the above-mentioned methods of the implementations of the present disclosure.

By means of implementations of the present disclosure, an authority fingerprint is acquired, and the authority fingerprint is a fingerprint having the authority of changing a screen display direction; when a first fingerprint is acquired, it is judged whether the first fingerprint is the authority fingerprint, if so, an input direction of the first fingerprint is acquired and the screen display direction is adjusted according to the input direction of the first fingerprint. Besides, the authority fingerprint for changing the screen direction can be preset. When the first fingerprint is acquired, if the first fingerprint is the authority fingerprint, the screen display direction is adjusted according to the input direction of the first fingerprint, so that a timing for adjusting the screen display direction can be judged accurately, and the accuracy of adjusting the screen display direction can be improved.

The above-described apparatus implementations are merely illustrative, in which a unit described as a separate component may or may not be physically separated, a component displayed as a unit may or may not be a physical unit, that is to say, the component may be located at one place or be distributed on multiple network units. A part or all of the modules may be selected according to practical needs so as to achieve the object of the technical solutions of the present disclosure, which may be understood and implemented by those skilled in the art without creative labor.

The steps of the method of the implementations of the present disclosure can be adjusted in order, combined, and eliminated according to actual needs.

The modules or units of the apparatus of the implementations of the present disclosure can be combined, divided, or eliminated according to actual needs.

The modules or units of the implementations of the present disclosure can be achieved by a universal integrated circuit (for example, central processing unit (CPU)) or an application specific integrated circuit (ASIC).

By means of the description of the implementations, it should be clearly appreciated by those skilled in the art that the implementations may be implemented by means of software with aid of essential universal hardware platform or by means of hardware. Based on this understanding, parts of the technical solutions of the present disclosure that make a contribution to the related art or all or part of the technical solutions can be embodied in the form of software products. The computer software products can be stored in a readable storage medium, such as ROM/RAM, a magnetic disc and an optical disc, and includes one or more instructions for causing computer equipment (such as a personal computer, a server, a network device and the like) to implement all or part of steps of the above-mentioned methods of the implementations of the present disclosure.

The scope of the present disclosure is not limited to the above-described implementations. Any modifications, equivalent replacements or improvements without departing from the spirit and principle of the present disclosure, shall fall within the scope of the present disclosure.

What is claimed is:

1. A method for adjusting a screen display direction, comprising:
   acquiring an authority fingerprint, wherein the authority fingerprint is a fingerprint having an authority of changing a screen display direction;
   when a first fingerprint is acquired, judging whether the first fingerprint is the authority fingerprint;
   when the first fingerprint is the authority fingerprint, acquiring an input direction of the first fingerprint;
   adjusting the screen display direction according to the input direction of the first fingerprint;
   when the first fingerprint is acquired again, recording a time period for acquiring the first fingerprint; and
   adjusting a size of a screen display area according to the time period recorded of the first fingerprint,
   wherein the size of the screen display area is adjusted to a first size based on a determination that the time period recorded is a first time period, the size of the screen display area is adjusted to a second size based on a determination that the time period recorded is a second time period, the first time period being longer than the second time period, and the first size being smaller than the second size.

2. The method of claim 1, wherein after acquiring the authority fingerprint, the method further comprises:
   acquiring and storing an input direction of the authority fingerprint; and
   determining a screen display direction corresponding to the input direction of the authority fingerprint.

3. The method of claim 2, wherein after judging whether the first fingerprint is the authority fingerprint, the method further comprises:
   when the first fingerprint is not the authority fingerprint, outputting a first prompting message, the first prompting message being configured to prompt to set the first fingerprint as the authority fingerprint and prompt to input the input direction of the first fingerprint, to determine a screen display direction corresponding to the input direction of the first fingerprint.

4. The method of claim 3, wherein adjusting the screen display direction according to the input direction of the first fingerprint comprises:
   judging whether the input direction of the first fingerprint is the same as a pre-stored input direction of the authority fingerprint; and
   when the input direction of the first fingerprint is the same as the pre-stored input direction of the authority fingerprint, adjusting the screen display direction to a direction corresponding to the pre-stored input direction of the authority fingerprint according to the pre-stored input direction of the authority fingerprint.

5. The method of claim 1, wherein the adjusting a size of a screen display area according to the time period recorded of the first fingerprint comprises:
   adjusting the size of the screen display area to a largest available screen display area based on a determination that the time period recorded exceeds a preset threshold, the preset threshold being greater than the first time period.

6. The method of claim 1, wherein the acquiring an input direction of the first fingerprint comprises:
   acquiring a sliding direction of a finger when the finger slides over a surface of a sliding fingerprint sensor; and
   determining the sliding direction as the input direction of the first fingerprint.

7. A terminal, comprising:
   at least one processor; and
   a computer readable storage, coupled to the at least one processor and storing at least one computer executable instruction thereon, which when executed by the at least one processor, cause the at least one processor to:
   acquire an authority fingerprint, wherein the authority fingerprint is a fingerprint having an authority of changing a screen display direction;
   judge whether a first fingerprint is the authority fingerprint when the first fingerprint is acquired;
   acquire an input direction of the first fingerprint when the first fingerprint is the authority fingerprint;
   adjust the screen display direction according to the input direction of the first fingerprint;
   record a time period for acquiring the first fingerprint when the first fingerprint is acquired again; and
   adjust a size of a screen display area according to the time period recorded of the first fingerprint, wherein the size of the screen display area is adjusted to a first size based on a determination that the time period recorded is a first time period, the size of the screen display area is adjusted to a second size based on a determination that the time period recorded is a second time period, the first time period being longer than the second time period, and the first size being smaller than the second size.

8. The terminal of claim 7, wherein when executed by the at least one processor, the at least one computer executable instruction further causes the at least one processor to:
   acquire and store an input direction of the authority fingerprint; and
   determine a screen display direction corresponding to the input direction of the authority fingerprint.

9. The terminal of claim 8, wherein when executed by the at least one processor, the at least one computer executable instruction further causes the at least one processor to:

output a first prompting message when the first fingerprint is not the authority fingerprint, the first prompting message being configured to prompt to set the first fingerprint as the authority fingerprint and to prompt to input the input direction of the first fingerprint so as to determine a screen display direction corresponding to the input direction of the first fingerprint.

10. The terminal of claim 9, wherein when executed by the at least one processor, the at least one computer executable instruction further causes the at least one processor to:
  judge whether the input direction of the first fingerprint is the same as a pre-stored input direction of the authority fingerprint; and
  adjust the screen display direction to a direction corresponding to the pre-stored input direction of the authority fingerprint according to the pre-stored input direction of the authority fingerprint when the judging unit judges that the input direction of the first fingerprint is the same as the pre-stored input direction of the authority fingerprint.

11. The terminal of claim 7, wherein the at least one processor configured to adjust the size of the screen display area according to the time period recorded of the first fingerprint is configured to:
  to adjust the size of the screen display to a largest available screen display area based on a determination that the time period recorded exceeds a preset threshold, the preset threshold being greater than the first time period.

12. The terminal of claim 7, wherein the at least one processor configured to acquire the input direction of the first fingerprint is configured to:
  acquire a sliding direction of a finger when the finger slides over a surface of a sliding fingerprint sensor; and
  determine the sliding direction as the input direction of the first fingerprint.

* * * * *